United States Patent
Jeffries

(10) Patent No.: US 8,328,949 B1
(45) Date of Patent: Dec. 11, 2012

(54) EGG CLEANSING TOWELETTE

(76) Inventor: Samuel Jeffries, Franklin, MA (US)

(*) Notice: Subject to any disclaimer, the term of this patent is extended or adjusted under 35 U.S.C. 154(b) by 0 days.

(21) Appl. No.: 13/341,367

(22) Filed: Dec. 30, 2011

(51) Int. Cl.
*B08B 7/00* (2006.01)

(52) U.S. Cl. ............... 134/6; 134/25.3; 134/42; 15/3.1; 15/104.93; 15/209.1; 15/210.1; 510/295; 510/421; 510/422; 510/437; 510/438

(58) Field of Classification Search .......... 134/6, 25.3, 134/42; 510/295, 421, 422, 437, 438; 15/3.1, 15/104.93, 209.1, 210.1
See application file for complete search history.

(56) References Cited

U.S. PATENT DOCUMENTS

| | | | |
|---|---|---|---|
| 1,352,138 A | 9/1920 | McCray | |
| 1,964,295 A | 6/1934 | Miller et al. | |
| 2,235,404 A | 3/1941 | Manggaard | |
| 2,566,475 A * | 9/1951 | Wright | 451/111 |
| 2,639,561 A | 5/1953 | Aspinall | |
| 2,661,715 A | 12/1953 | McLean | |
| 3,360,817 A * | 1/1968 | Halverson | 15/3.13 |
| 3,548,435 A * | 12/1970 | Comber et al. | 15/3.17 |
| 2005/0170983 A1 * | 8/2005 | Mahdessian | 510/277 |
| 2008/0190954 A1 * | 8/2008 | Kooyman | 221/22 |

* cited by examiner

*Primary Examiner* — Bibi Carrillo
(74) *Attorney, Agent, or Firm* — Gilman Clark Hunter & Mess

(57) ABSTRACT

An apparatus and method for cleaning a freshly laid egg is provided. An egg cleansing towelette is impregnated with an egg cleansing solution and sealed in a container. The towelette can be removed from the container when needed. The impregnated towelette can be rubbed over the shell of the freshly laid egg to remove dirt, blood, yolk and other undesirable materials found in a chicken coop. The towelette can also include an abrasive material to help remove the undesirable material. The egg cleansing solution can be fragrance-free and blended as to not potentially damage the bloom on the egg. The towelettes can be purchased in a container with a resealable opening.

5 Claims, 2 Drawing Sheets

EGG CLEANSING TOWELETTE

BACKGROUND

Small scale farming is making a resurgence in urban and suburban areas as a growing number of people seek organic alternatives for their dietary needs and educational tools for children in learning about sustainable living. One such example is the increasing number of chicken coops that are being constructed and tended by urban dwelling families. In many cases, several families will form a partnership for the sole purpose of acquiring and attending to a small flock of chickens. A primary reason behind the joint cooperation is the sharing of eggs produced by the chickens. While the ultimate result of consuming freshly laid eggs is the obvious objective, the reality of attending to the flock, and collecting and cleaning the eggs in particular, often requires more time than is available to a part time chicken farmer. Additionally, freshly laid eggs are often contaminated with chicken droppings and other matter that one expects in a chicken coop (e.g., dirt, blood, yolk). Many of these contaminants can be dangerous to humans if consumed. For this reason, cleaning eggs that are freshly obtained from a hen is an important step that must occur.

Typical methods that are available to a small scale farmer for cleaning eggs include dry cleaning the eggs with an abrasive material (e.g., sand paper, abrasive sponge, loofah). This method is often preferred because it preserves the egg's natural antibacterial coating (i.e., the bloom). For some particularly dirty eggs, however, dry cleaning is insufficient and a wet cleaning method is preferred. Wet cleaning methods typically include rinsing the eggs with running water and then using a towel to dry them. The eggs can then be sanitized with a spray mixture of diluted bleach. Wet cleaning methods can also include soaking eggs in a cleansing solution (i.e., water with yeast, citric acid and potassium sorbate) for a few minutes. Other soaking and sanitizing solutions can also be used.

The proposed Egg Cleansing Towelette can provide the benefits of both dry and wet cleaning methods in a self-contained product.

SUMMARY

An example of an article of manufacture for cleaning a fresh egg includes a cloth impregnated with a solution for cleaning a fresh egg where the cloth is disposed in a container configured to reduce the rate at which the solution can evaporate from the cloth.

Implementations of such an article of manufacture may include one or more of the following features. The cloth can be composed of recyclable materials which are biodegradable and suitable for a composting area. The cloth can be impregnated with a mild abrasive and can have a fabric area density of 54 grams per square meter. The solution can be a plant based formulation including water, non-ionic surfactants derived from corn, water conditioner, preservative, and an oil selected from the group consisting of coconut oil, palm oil, and combinations thereof. The percentage of the preservative can be approximately 0.2% and the solution can be fragrance free. The container can include a resealable opening and can indicate the relative abrasiveness of the cloth.

An example of a method of cleaning a fresh egg without soaking the egg includes removing an egg cleansing towelette impregnated with an egg cleansing solution from a first container, rubbing the egg with the egg cleansing towelette until the egg is clean, and placing the egg in an appropriate second container.

Implementation of such a method may include one or more of the following features. The egg cleansing towelette can be made from cloth which can be composed of recyclable materials which are biodegradable and suitable for a composting area. The cloth can be impregnated with a mild abrasive and can have a fabric area density of 54 grams per square meter. The egg cleansing solution can be a plant based formulation including water, non-ionic surfactants derived from corn, water conditioner, preservative, and an oil selected from the group consisting of coconut oil, palm oil, and combinations thereof. The percentage of the preservative can be approximately 0.2% and the solution can be fragrance free. The first container can include a resealable opening, can be configured to reduce the rate at which the solution can evaporate from the cloth, and can indicate the relative abrasiveness of the cloth.

An example of an article of manufacture for cleaning a fresh egg includes liquid cleaning means disposed on at least one cloth and storing means for storing one or more cloths and the liquid cleaning means.

Implementations of the article of manufacture include a liquid cleaning means composed of a plant based solution including water, non-ionic surfactants derived from corn, water conditioner, preservative, and an oil selected from the group consisting of coconut oil, palm oil, and combinations thereof. The percentage of the preservative can be approximately 0.2% and the solution can be fragrance free. The cloth can be impregnated with a mild abrasive and can be made from recyclable materials which are biodegradable and suitable for a composting area. The storing means can be configured to reduce the rate at which the liquid cleaning means can evaporate from the cloth and can also include a resealable opening.

DETAILED DESCRIPTION OF PREFERRED EMBODIMENTS

Embodiments of the invention provide techniques for cleaning eggs with an egg cleansing towelette. This towelette is exemplary, however, and not limiting of the invention as other implementations in accordance with the disclosure are possible.

Figure 1:
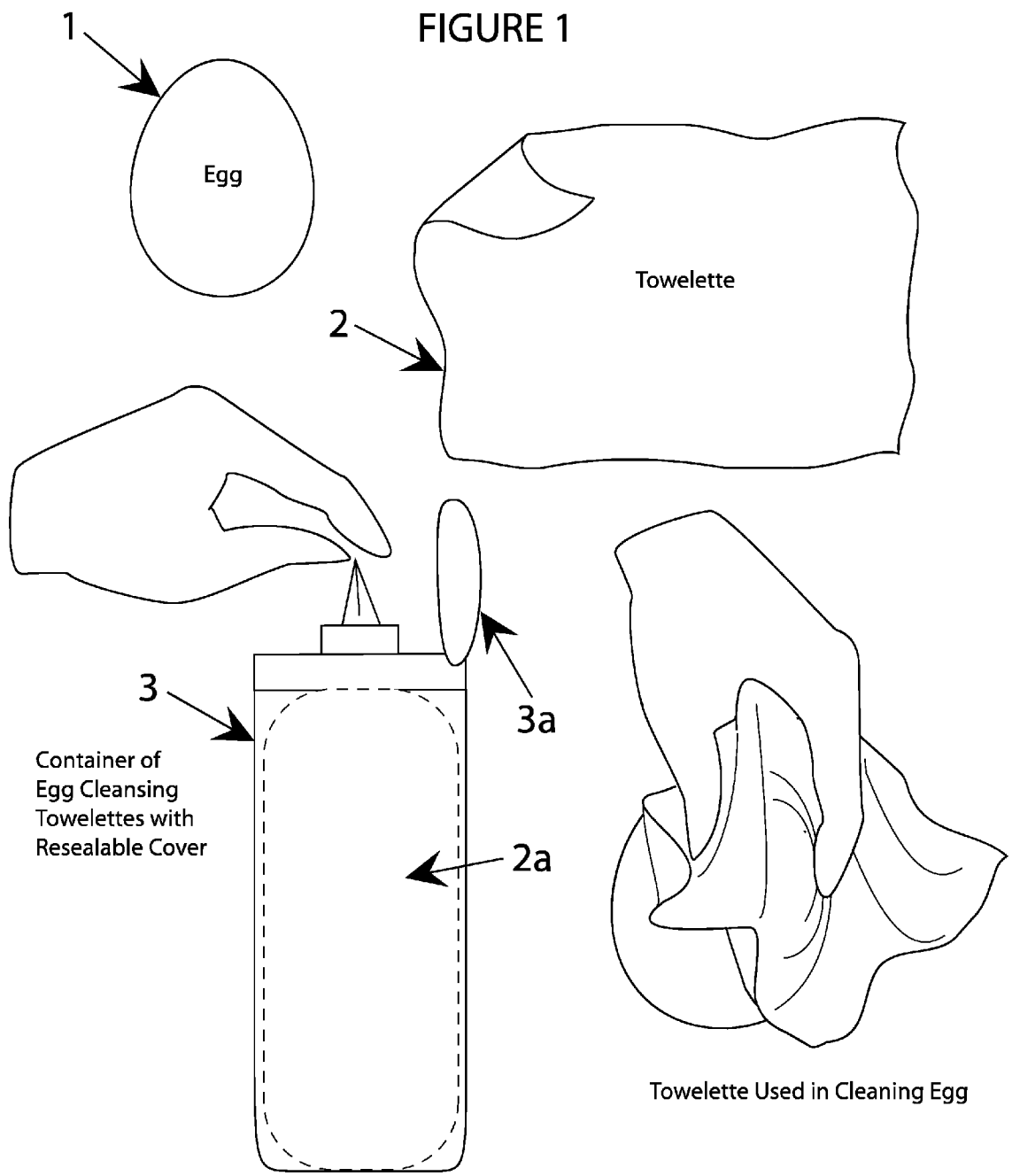
FIG. 1 depicts an exemplary egg cleansing towelette and dispensing container.

Referring to FIG. 1, an egg 1, an egg cleansing towelette 2, and dispenser 3 are shown. The egg cleansing towelette 2 is comprised of a cloth which is impregnated with a cleaning solution. As an example, and not a limitation, the cloth provides a fabric area density of 54 grams per square meter. Other materials with different densities can be used. A consumer can purchase a container 3 which includes several (e.g., 20, 30, 40, 50, . . . , 100), towelettes 2a. The container 3 (i.e., dispenser) can include a resealable opening 3a, and can be configured to dispense the towelettes 2 one at a time. The container 3 is configured to prevent the towelettes 2a from drying out. That is, the dispenser should, to the extent practicable, be water and air tight. While the integrity of the container 3 is not critical to initial functionality of the towelette 2, the integrity of the container 3 can impact the shelf life of the unused towelettes 2a. The container 3 is provided to reduce the rate at which the cleaning solution will evaporate from the towelette. The container 3 can be a rigid container or a flexible (i.e. soft) container. The shape of the container 3 is exemplary only, and not a limitation, as other shapes can be used (e.g., rectangle, square, round, egg shaped containers). A resealable opening 3a can be a snap lid, screw lid, zip-lock or other assembly configured to help maintain the integrity of the container 3. In an embodiment, the container 3 can contain a single towelette 2 and thus eliminate the need for a resealable opening (i.e., the container can be configured to tear open).

In an embodiment, the towelette 2 includes a mild abrasive which is impregnated into the cloth. For example, the towelette 2 may include fine grains of silica or other crystalline substrate to help facilitate the cleansing action. The abrasiveness and/or fabric density of the towelette 2 can vary by the container 3. The egg cleansing towelette 2 can be productized and marketed according to, for example, the parameters associated with the cloth (e.g., abrasiveness, density, weight, material). In an embodiment, the cloth is made from recyclable materials which are biodegradable and suitable for a composting area.

In an embodiment, the cleansing solution that is impregnated into the towelette 2 comprises an environmentally friendly solution (i.e., citric acid) configured to help break down dirt and other material affixed to the egg shell, but mild enough not to potentially damage the bloom on the egg. As an example and not a limitation, the cleansing solution can be a plant based formulation including water, non-ionic surfactants derived from corn, water conditioner, preservative, and an oil selected from the group consisting of coconut oil, palm oil, and combinations thereof. In an embodiment, the preservative is approximately 0.2% of the solution. Other amounts of preservative may also be used. A factor in choosing a cleaning solution is the reduction of any fragrant compounds that may leach into the egg through the porous egg shell. A fragrant-free compound is preferred.

Figure 2:
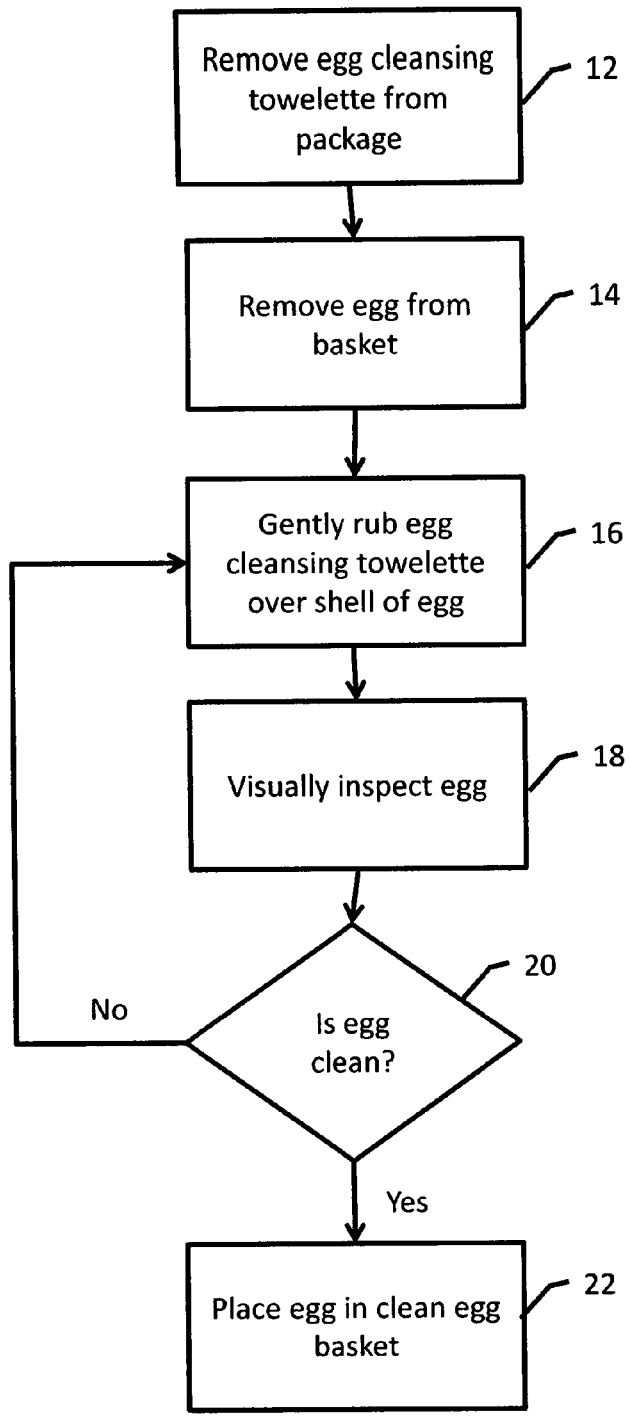
FIG. 2 is an exemplary process for cleaning an egg with an egg cleansing towelette.

In operation, referring to FIG. 2, with further reference to FIG. 1, a process 10 for cleaning an egg using the towelette 2 includes the stages shown. The process 10, however, is exemplary only and not limiting. The process 10 may be altered, e.g., by having stages added, removed, or rearranged.

At stage 12, a towelette 2 can be removed from the container 3. A user can open the resealable lid 3a and access a single towelette 2. The bunch of towelettes 2a can be configured such that a new towelette 2 is presented at the lid 3a whenever one towelette is removed from the container 3. In an embodiment, only a single towelette 2 is contained in a non-resealable container 3. At stage 14, an egg 1 can be removed from a basket or other area (e.g., the nest, an untucked shirt, an overturned hat) and held in one hand. Typically, a fresh egg can be coated with dirt, blood, old yolks, and other undesirable matter present in a chicken coop. At stage 16, the egg cleansing towelette 2 can be rubbed gently over the shell of the egg to remove the dirt and other undesirable matter. Since the towelette 2 is impregnated with a cleansing solution, additional rinsing or spraying is generally not required.

At stage 18, the egg can be visually inspected for dirt and other undesirable matter. If the egg is clean at stage 20, then the clean egg can be placed in a clean egg basket or other appropriate container at stage 22. If the egg appears to be dirty at stage 20, then the shell can continue to be rubbed by the towelette 2 at stage 16. For particularly dirty eggs an additional towelette 2 can be retrieved from the container 3 and used on the egg 1.

Further, while the description above refers to the invention, the description may include more than one invention.

What is claimed is:

1. A method of cleaning a fresh egg without soaking the egg, comprising:

removing an egg cleansing towelette from a first container, wherein the egg cleansing towelette is impregnated with an egg cleansing solution comprising water, non-ionic surfactants derived from corn, water conditioner, preservative, and an oil selected from the group consisting of coconut oil, palm oil, and combinations thereof;

rubbing the egg with the egg cleansing towelette until the egg is clean; and placing the egg in a second container.

2. The method of claim 1 wherein the egg cleansing towelette comprises a cloth made from recyclable materials which are biodegradable and suitable for a composting area.

3. The method of claim 1 wherein the egg cleansing towelette comprises a cloth impregnated with an abrasive.

4. The method of claim 1 wherein the first container comprises a resealable opening and is configured to reduce a rate at which the solution can evaporate from the towelette.

5. The method of claim 2 wherein the cloth has a fabric area density of 54 grams per square meter.

* * * * *